United States Patent
Liang et al.

(10) Patent No.: US 10,022,879 B2
(45) Date of Patent: Jul. 17, 2018

(54) ROBOT CONTROLLER WHICH RECORDS STATE OF OCCURRENCE OF EMERGENCY STOP OF ROBOT

(71) Applicant: FANUC CORPORATION, Yamanashi (JP)

(72) Inventors: Yanxue Liang, Yamanashi (JP); Yoshiharu Nagatsuka, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/297,258

(22) Filed: Oct. 19, 2016

(65) Prior Publication Data

US 2017/0151680 A1 Jun. 1, 2017

(30) Foreign Application Priority Data

Nov. 30, 2015 (JP) .................................. 2015-233189

(51) Int. Cl.
*B25J 19/06* (2006.01)
*B25J 13/08* (2006.01)
(Continued)

(52) U.S. Cl.
CPC ............. *B25J 19/06* (2013.01); *B25J 9/1674* (2013.01); *B25J 13/06* (2013.01); *B25J 13/085* (2013.01); *B25J 13/088* (2013.01)

(58) Field of Classification Search
CPC .......... G05B 2219/14116; G05B 2219/14097; G05B 2219/14087; G05B 2219/14098;
(Continued)

(56) References Cited

U.S. PATENT DOCUMENTS

| | | | |
|---|---|---|---|
| 2009/0173726 A1* | 7/2009 | Davidson | B23K 9/0956 219/130.01 |
| 2012/0331352 A1* | 12/2012 | Guenther | G05B 19/0426 714/38.1 |

(Continued)

FOREIGN PATENT DOCUMENTS

| | | |
|---|---|---|
| CN | 1397412 A | 2/2003 |
| CN | 101278244 A | 10/2008 |

(Continued)

*Primary Examiner* — Ryan Rink
(74) *Attorney, Agent, or Firm* — Hauptman Ham, LLP

(57) ABSTRACT

A robot controller configured to be able to mitigate the effect that an emergency stop may have on a robot is disclosed. The robot controller includes: a load detection unit which detects the load of a motor for driving each individual articulated axis of the robot; a speed detection unit which detects an axial speed at each individual articulated axis of the robot; a cause-of-stop identifying unit which, when an emergency stop of the robot occurs, identifies a cause of the occurrence of the emergency stop; and a recording unit which records the cause of the occurrence of the emergency stop by associating the cause with the axial speed or the load of the motor. The robot controller may further include a display unit which displays information representing the state of occurrence of the emergency stop of the robot.

2 Claims, 5 Drawing Sheets

(51) Int. Cl.
*B25J 9/16* (2006.01)
*B25J 13/06* (2006.01)

(58) Field of Classification Search
CPC .......... G05B 2219/14099; G05B 2219/14101; G05B 2219/14103; G05B 2219/14112; G05B 2219/14114
See application file for complete search history.

(56) References Cited

U.S. PATENT DOCUMENTS

2015/0328774 A1* 11/2015 Yajima ................. B25J 9/1674 700/261
2016/0346861 A1* 12/2016 Davidson ............. B23K 9/0956
2017/0210009 A1* 7/2017 Yajima ................. B25J 9/1676
2017/0261970 A1* 9/2017 Fujimura ........... G05B 23/0218

FOREIGN PATENT DOCUMENTS

| | | |
|---|---|---|
| CN | 102689307 A | 9/2012 |
| CN | 104044141 A | 9/2014 |
| CN | 104070522 A | 10/2014 |
| CN | 104136174 A | 11/2014 |
| JP | 60-157602 A | 8/1985 |
| JP | 62-89118 A | 4/1987 |
| JP | 63-318287 A | 12/1988 |
| JP | 2002-229642 A | 8/2002 |
| JP | 2003-25271 A | 1/2003 |
| JP | 2006-11730 A | 1/2006 |
| JP | 2006312208 A | 11/2006 |
| JP | 2007030078 A | 2/2007 |
| JP | 2009233852 A | 10/2009 |
| JP | 4450682 B2 | 4/2010 |
| JP | 2011224727 A | 11/2011 |

* cited by examiner

ROBOT CONTROLLER WHICH RECORDS STATE OF OCCURRENCE OF EMERGENCY STOP OF ROBOT

RELATED APPLICATIONS

The present application claims priority to Japanese Patent Application Number 2015-233189, filed Nov. 30, 2015, the disclosure of which is hereby incorporated by reference herein in its entirety.

BACKGROUND OF THE INVENTION

1. Field of the Invention

The present invention relates to a robot controller for controlling a robot.

2. Description of the Related Art

Industrial robots are used in many places such as automobile assembly lines and food manufacturing sites. Techniques have been proposed in the related art for bringing a robot safely to an emergency stop when the robot collides with a human or an object located in the vicinity thereof or when the imminence of such a collision is detected (Refer, for example, to Japanese Unexamined Patent Publication Nos. 2006-312208, 2007-030078, 2009-233852, and 2011-224727).

SUMMARY OF THE INVENTION

The related art is intended primarily to protect humans working in the vicinity of the robot at the time of an emergency stop. On the other hand, it has been found that when the robot is brought to an emergency stop for safety, damage may be caused to some components of the robot, leading to a reduction in the service life of the robot. There is therefore a need for a technique that can mitigate the effect that the emergency stop may have on the robot.

According to the present invention, a robot controller for controlling a robot is provided which includes: a load detection unit which detects the load of a motor for driving each individual articulated axis of the robot; a speed detection unit which detects an axial speed at each individual articulated axis of the robot; a cause-of-stop identifying unit which, when an emergency stop of the robot occurs, identifies a cause of the occurrence of the emergency stop; and a recording unit which records the cause of the occurrence of the emergency stop by associating the cause with the axial speed or the load of the motor.

In a preferred embodiment, the robot controller further includes a display unit which displays information representing the state of occurrence of the emergency stop of the robot.

In a preferred embodiment, the display unit is configured so that each time the robot is brought to an emergency stop, at least one of the axial speed and the load of the motor detected at the time of occurrence of the emergency stop is displayed in the form of a graph for each individual one of the articulated axes.

In a preferred embodiment, the display unit is configured to display the information by associating the number of occurrences of the emergency stop with the cause of the emergency stop, the articulated axes of the robot, and at least one of the axial speed and the load of the motor.

In a preferred embodiment, the display unit is configured to display at least one of the axial speed and the load of the motor together with the number of occurrences of the emergency stop, separately for each predetermined magnitude range.

BRIEF DESCRIPTION OF THE DRAWINGS

These and other objects, features, and advantages of the present invention will become more apparent from the description of the illustrative embodiments as set forth below with reference to the accompanying drawings, wherein.

DETAILED DESCRIPTION

Figure 1:
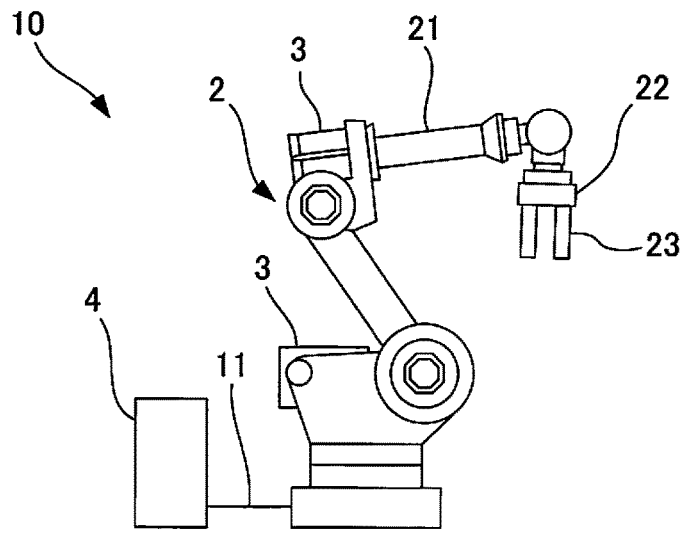
FIG. 1 is a diagram showing a configuration example of a robot system to which the present invention can be applied.

Embodiments of the present invention will be described below with reference to the accompanying drawings. For ease of understanding of the present invention, the component elements of the embodiments illustrated herein are not necessarily drawn to scale. Further, the same or corresponding component elements are designated by the same reference numerals throughout the drawings.

FIG. 1 shows a configuration example of a robot system to which the present invention can be applied. The robot system 10 includes a robot 2 and a robot controller 4 for controlling the robot 2.

The robot 2 is an articulated robot which is, for example, a six-axis vertically articulated robot as shown. The robot 2 is an industrial robot used for such purposes as spot welding, arc welding and work handling.

The robot 2 further includes a motor 3 for driving each individual articulated axis. The motor 3 is controlled by the robot controller 4 connected to the robot 2 via a known communication means such as a communication cable 11.

The robot 2 is equipped with an end effector 23 which is attached to a wrist 22 located at the forward end of an arm 21. The robot 2 operates in response to a command from the robot controller 4 so as to move the wrist 22, and hence the end effector 23, to a desired position and orientation.

Figure 2:
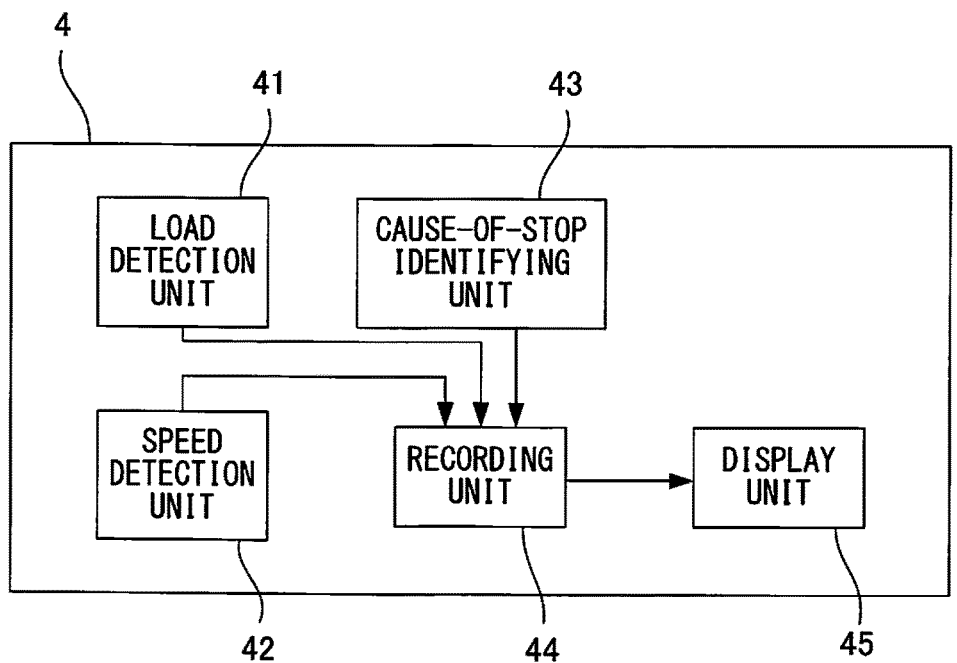
FIG. 2 is a functional block diagram of a robot controller according to one embodiment.

The robot controller 4 is a digital computer having a known hardware configuration that includes a CPU, ROM, RAM, nonvolatile memory, and input/output interface. As shown in FIG. 2, the robot controller 4 includes a load detection unit 41, a speed detection unit 42, a cause-of-stop identifying unit 43, a recording unit 44, and a display unit 45.

The load detection unit 41 detects the load of the motor 3 for driving each individual articulated axis of the robot 2. The load of the motor 3 to be detected by the load detection unit 41 is calculated, for example, from an output value of a torque sensor provided at the articulated axis of the robot 2 or from the value of a current supplied to the motor 3 via an amplifier. The load detection unit 41 can be configured to detect a given physical quantity that has correlation with the load of the motor 3.

The speed detection unit 42 detects an axial speed at each individual articulated axis of the robot 2. The axial speed detected by the speed detection unit 42 is not limited to the rotating speed of the articulated axis, but may be some other kind of speed that has correlation with the speed of the articulated axis. The speed at the input end of a reducer interposed between the motor 3 and the articulated axis may be detected as the axial speed.

When an emergency stop of the robot 2 occurs, the cause-of-stop identifying unit 43 identifies the cause of the occurrence of the emergency stop. Possible causes of an emergency stop of the robot 2 include the robot 2 coming into contact with a human or an object located in the vicinity thereof, the overheating of the motor 3, an erroneous operation by an operator, unlocking of a safety fence door, and the activation of an emergency stop button, but are not limited to these causes.

The recording unit 44 records the cause of the occurrence of the emergency stop of the robot 2 by associating the cause with the axial speed or the load of the motor 3. That is, the cause of the emergency stop is recorded by the recording unit 44 as a set of data together with at least one of the axial speed and the load of the motor 3 detected at the time of occurrence of the emergency stop. The data recorded by the recording unit 44 is stored in the nonvolatile memory internal to the robot controller 4.

The display unit 45 displays information representing the state of occurrence of the emergency stop of the robot 2. In one embodiment, the display unit 45 may be configured so that each time the robot 2 is brought to an emergency stop, at least one of the axial speed and the load of the motor 3 detected at the time of occurrence of the emergency stop is displayed in the form of a graph for each individual articulated axis.

In one embodiment, the display unit 45 may be configured to display the information by associating the number of occurrences of the emergency stop with the cause of the emergency stop of the robot 2, the articulated axes of the robot 2, and at least one of the axial speed and the load of the motor 3.

In one embodiment, the display unit 45 may be configured to display at least one of the axial speed and the load of the motor 3 together with the number of occurrences of the emergency stop, separately for each predetermined magnitude range.

In one embodiment, the display unit 45 displays a graph representing the state of occurrence of the emergency stop on a display device, for example, an operation teaching panel, connected to the robot controller 4.

Figure 3:
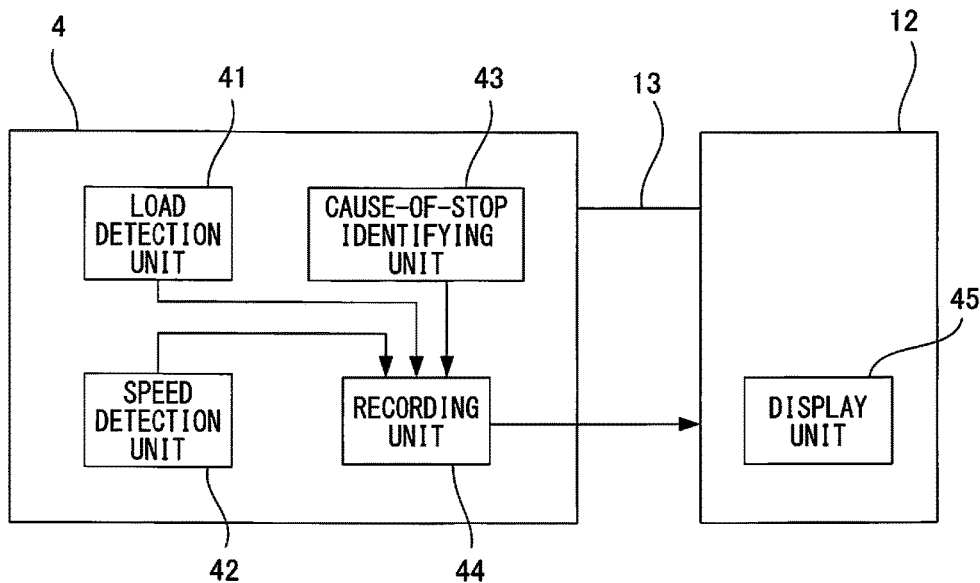
FIG. 3 is a functional block diagram of a robot controller according to another embodiment.
Figure 4:
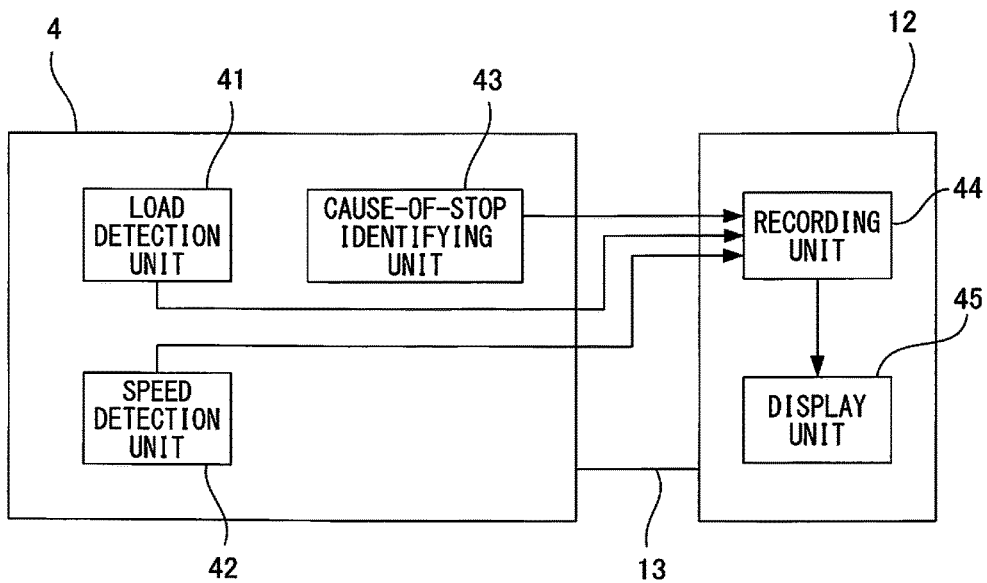
FIG. 4 is a functional block diagram of a robot controller according to still another embodiment.

The step of graphing the cause of the emergency stop and the motor load or axial speed may be carried out by a processor incorporated in the robot controller 4. Alternatively, the graphing step may be carried out by a server 12 connected to the robot controller 4 via a network 13 (see FIG. 3). In an alternative embodiment, the functions of the recording unit 44 and display unit 45 may be implemented by a server 12 connected to the robot controller 4 via a network 13 (see FIG. 4).

Figure 5:
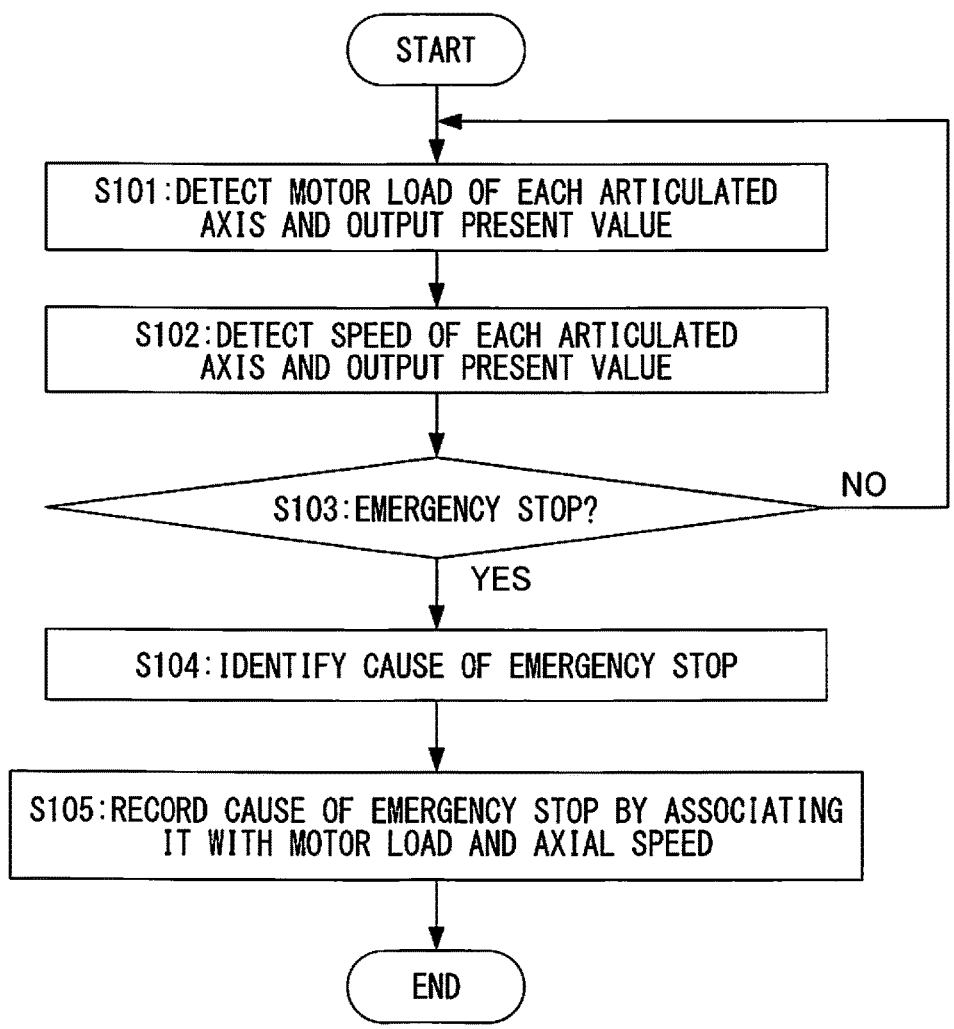
FIG. 5 is a flowchart illustrating the process performed by the robot controller according to the one embodiment.

The process performed by the robot controller 4 according to the one embodiment will be described below with reference to FIG. 5. During the operation of the robot 2, the load detection unit 41 detects, at periodic intervals, the load of the motor 3 driving each individual articulated axis, and outputs the detected value as the present value of the load of the motor 3 (step S101). Likewise, the speed detection unit 42 detects the axial speed of each individual articulated axis at periodic intervals and outputs the detected value as the present value of the axial speed (step S102).

In step S103, it is determined whether or not the robot 2 has come to an emergency stop. If there is no occurrence of an emergency stop, the process returns to step S101 to continue to detect the motor load and the axial speed.

If it is determined in step S103 that the robot 2 has come to an emergency stop, the cause-of-stop identifying unit 43 identifies the cause of the emergency stop.

In step S104, the recording unit 44 records the cause of the emergency stop by associating it with the motor load and the axial speed.

Figure 6:
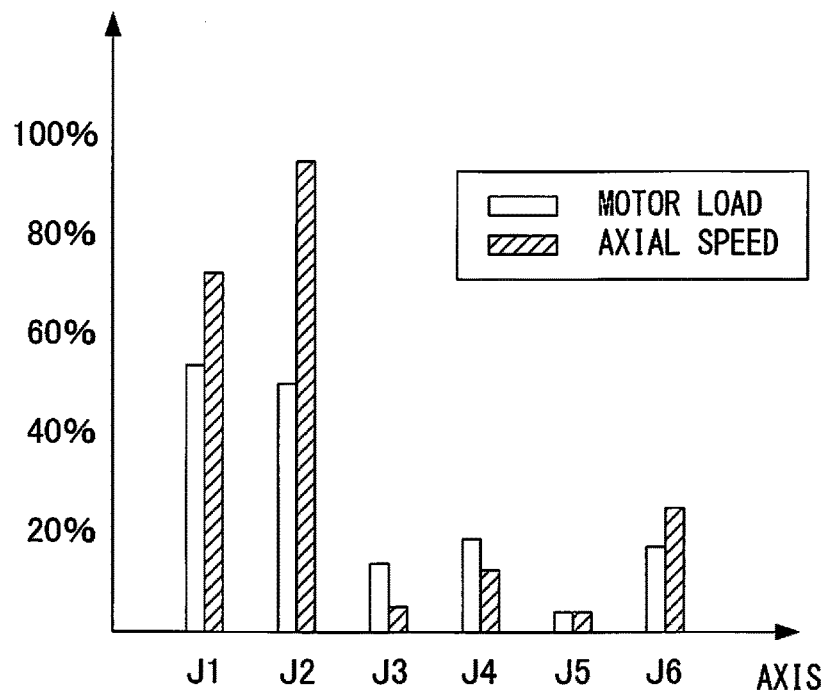
FIG. 6 is a diagram showing one example of a graph representation.

FIG. 6 shows one example of a graph representation displayed by the robot controller 4 according to the one embodiment. Referring to FIG. 6, the motor load and the axial speed are shown for each of the articulated axes J1 to J6. As shown, the motor load and the axial speed may each be represented by a value relative to the maximum motor load or the maximum axial speed, or may be represented by an absolute value.

In one embodiment, the display unit 45 may be configured to display the graph by combining two pieces of information selected from among the cause of the emergency stop, the articulated axes of the robot 2, the motor load of each individual articulated axis, and the axial speed of each individual axis. The combination of the information to be displayed by the display unit 45 is not limited to any example explicitly indicated in this patent specification.

Figure 7:
FIG. 7 is a diagram showing another example of a graph representation.

FIG. 7 shows another example of a graph representation displayed by the robot controller 4. Referring to FIG. 7, the number of occurrences of the emergency stop is shown for each of the articulated axes J1 to J6. It is to be understood here that the number of occurrences of the emergency stop is not counted for any articulated axis that is in an inoperative condition at the time of occurrence of the emergency stop. The number of occurrences of the emergency stop is counted by a counter internal to the robot controller 4.

Figure 8:
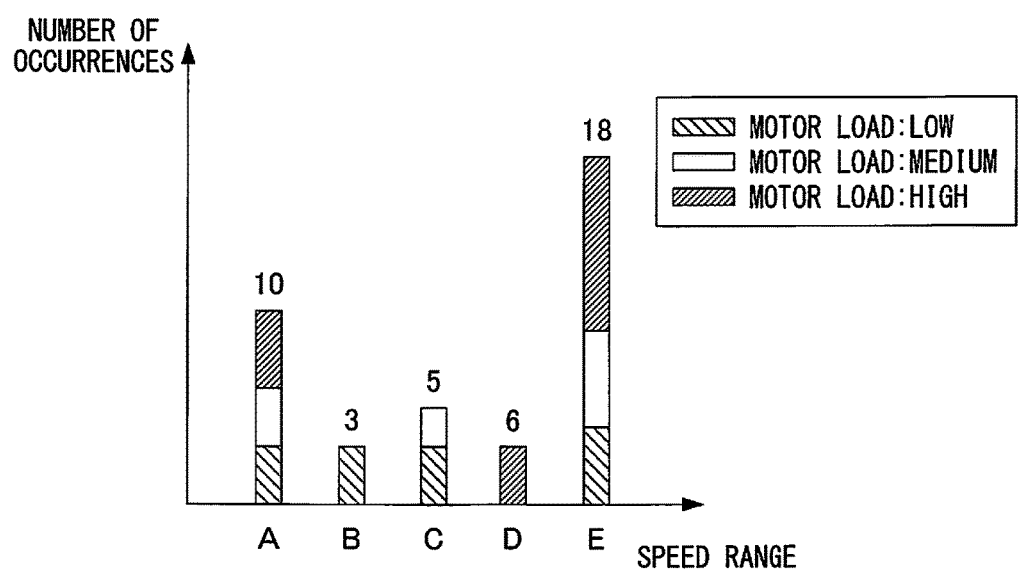
FIG. 8 is a diagram showing still another example of a graph representation.

FIG. 8 shows still another example of a graph representation displayed by the robot controller 4. Referring to FIG. 8, the number of occurrences of the emergency stop is shown for each of predetermined axial speed ranges A to E and for each of the predetermined motor load ranges in an identifiable manner. The axial speed ranges A to E are determined according to the magnitude of the axial speed so that the relation A<B<C<D<E holds. The greater the magnitude of the axial speed at the time of occurrence of the emergency stop, the greater the impact to the robot 2 tends to become, thus increasing the chance of component breakage.

Further, the impact to the robot 2 becomes greater as the motor load, for example, the torque around the articulated axis, increases. In view of this, the axial speed ranges D and E or the high motor load range may be displayed in a different color so as to highlight such ranges. In this way, not only can the attention of the operator be attracted, but the degree to which the robot 2 is affected can be made visible. While, in FIG. 8, the association with the number of occurrences of the emergency stop is displayed separately for each axial speed range and for each motor load range, the association with the number of occurrences of the emergency stop may be displayed only for each axial speed range or for each motor load range.

Figure 9:
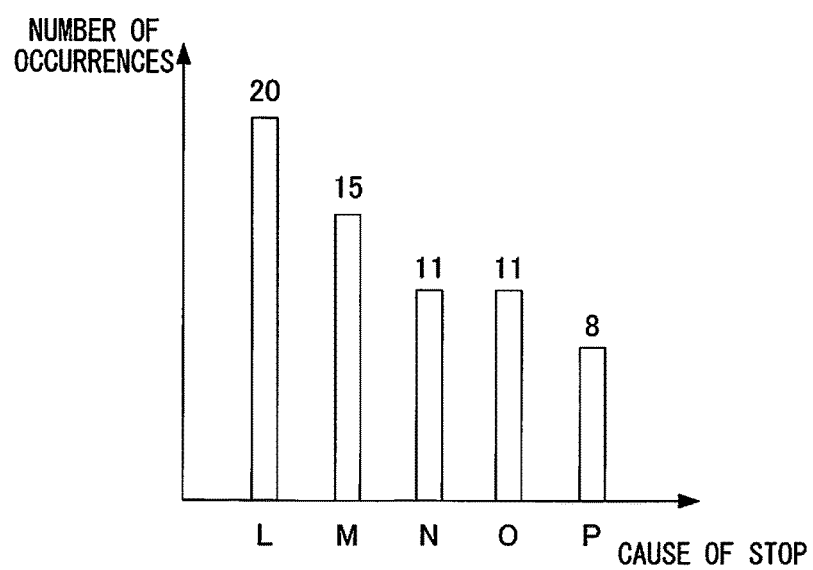
FIG. 9 is a diagram showing yet another example of a graph representation.

FIG. 9 shows yet another example of a graph representation displayed by the robot controller 4. Referring to FIG.

9, the number of occurrences of the emergency stop is shown separately for each of the causes of the emergency stops L to P.

The operator can take necessary measures, such as preventive measures, by analyzing the thus visualized relationship between the cause of the emergency stop and the number of occurrences. Further, when the robot controller 4 is connected to a host controller, the operation of the robot system 10 as a whole can be improved by making use of the information displayed by the display unit 45.

According to the robot controller 4 of the present embodiment, when the robot 2 is brought to an emergency stop, the cause of the emergency stop is recorded by associating the cause with the axial speed or the load of the motor 3 detected at the time of occurrence of the emergency stop. In this way, information concerning the state of occurrence of the emergency stop that can lead to an early failure of the robot 2 can be presented to the operator.

If the robot 2 frequently performs emergency stops, some components of the robot 2 may be damaged at an early stage, leading to a reduction in the service life of the robot 2. However, since the operator can take necessary measures, such as emergency stop preventive measures, by analyzing statistical data concerning the state of occurrence of the emergency stop, an increase in the service life of the robot 2 can be expected.

While various embodiments of the present invention have been described above, those skilled in the art will recognize that the effects and advantages intended by the present invention can also be achieved by other embodiments. In particular, it is possible to omit or replace some of the component elements of the above embodiments or add some known means thereto without departing from the scope of the invention. It is also apparent to those skilled in the art that the invention can also be carried out by suitably combining the features of a plurality of embodiments explicitly or implicitly disclosed in this patent specification.

According to the robot controller of the present invention, when the robot is brought to an emergency stop, the operating condition can be recorded by being associated with the cause of the emergency stop. This not only makes it easy for the operator to analyze the state of occurrence of the emergency stop, but also makes it possible to execute a measure as needed for preventing an early failure of the robot.

The invention claimed is:

1. A robot controller for controlling a robot, the robot controller comprising:
a load detection unit which detects a load of a motor for driving each individual articulated axis of the robot;
a speed detection unit which detects an axial speed at each individual articulated axis of the robot;
a cause-of-stop identifying unit which, when an emergency stop of the robot occurs, identifies a cause of the occurrence of the emergency stop;
a recording unit which records the cause of the occurrence of the emergency stop by associating the cause with the axial speed or the load of the motor; and
a display unit which displays information representing a state of occurrence of the emergency stop of the robot,
wherein the display unit is configured to display a number of occurrences of the emergency stop together with at least one of
each predetermined axial speed range among a plurality of predetermined axial speed ranges of the axial speed, said each predetermined axial speed range corresponding to the number of occurrences of the emergency stop, or
each predetermined motor load range of the load of the motor, said each predetermined motor load range corresponding to the number of occurrences of the emergency stop.

2. A robot controller for controlling a robot, the robot controller comprising:
a load sensor configured to detect a load of a motor for driving each individual articulated axis of the robot;
a speed sensor configured to detect an axial speed at each individual articulated axis of the robot;
a processor configured to, when an emergency stop of the robot occurs, identify a cause of the occurrence of the emergency stop;
a memory configured to record the cause of the occurrence of the emergency stop in association with the axial speed or the load of the motor; and
a display configured to display information representing a state of occurrence of the emergency stop of the robot,
wherein the display is configured to display
a plurality of predetermined magnitude ranges of at least one of the axial speed and the load of the motor, together with the number of occurrences of the emergency stop corresponding to each predetermined magnitude range among said plurality of predetermined magnitude ranges of said at least one of the axial speed and the load of the motor.

* * * * *